United States Patent
Iddles et al.

(10) Patent No.: US 7,732,362 B2
(45) Date of Patent: Jun. 8, 2010

(54) MICROWAVE DIELECTRIC CERAMIC

(75) Inventors: David Martin Iddles, Shrewsbury (GB); Duncan Muir, Sandback (GB); Timothy James Price, Market Drayton (GB)

(73) Assignee: Powerwave (UK) Ltd., Wolverhampton (GB)

( * ) Notice: Subject to any disclaimer, the term of this patent is extended or adjusted under 35 U.S.C. 154(b) by 104 days.

(21) Appl. No.: 11/959,384

(22) Filed: Dec. 18, 2007

(65) Prior Publication Data

US 2008/0167176 A1 Jul. 10, 2008

(30) Foreign Application Priority Data

Jan. 8, 2007 (GB) ................. 0700265.2

(51) Int. Cl.
*C04B 35/465* (2006.01)
(52) U.S. Cl. .................................... 501/136
(58) Field of Classification Search .................. 501/136
See application file for complete search history.

(56) References Cited

U.S. PATENT DOCUMENTS

| | | | | |
|---|---|---|---|---|
| 5,401,702 A | * | 3/1995 | Kim et al. ................... | 501/136 |
| 6,025,291 A | * | 2/2000 | Murakawa ................... | 501/136 |
| 6,645,896 B2 | * | 11/2003 | Okamoto et al. ............ | 501/136 |
| 6,881,694 B2 | * | 4/2005 | Mizui et al. ................. | 501/136 |
| 7,326,667 B2 | * | 2/2008 | Iddles et al. ................. | 501/136 |
| 2004/0029710 A1 | * | 2/2004 | Mizui et al. ................. | 501/136 |
| 2007/0035216 A1 | * | 2/2007 | Iddles et al. ................. | 310/358 |

FOREIGN PATENT DOCUMENTS

| | | | |
|---|---|---|---|
| EP | 1341189 | * | 9/2003 |
| JP | 11130544 | * | 5/1999 |
| JP | 2004182534 | * | 7/2004 |

* cited by examiner

*Primary Examiner*—Karl E Group
(74) *Attorney, Agent, or Firm*—Weaver Austin Villeneuve & Sampson LLP

(57) ABSTRACT

A dielectric ceramic material as claimed in claim 1 with a composition of formula $$x\, CaTiO_3 + (1-x)Sm_zRe_{(1-z)}AlO_3 \qquad (1)$$

optionally doped with about 0.005% to about 5% of $CeO_2$ as a dopant,
wherein $0.5 \leq x \leq 0.9$,
$0.3 \leq z \leq 0.995$, or
Re may be selected from a group consisting of La, Pr, Dy, Gd, Y, Er, Ho and mixtures thereof.

8 Claims, No Drawings

MICROWAVE DIELECTRIC CERAMIC

CROSS-REFERENCE TO RELATED APPLICATION

This application claims priority of U.K. Patent Application No. 0700265.2, filed on Jan. 8, 2007, which is hereby incorporated by reference.

This invention relates to a dielectric ceramic material and also to a dielectric resonator comprising the novel ceramic material, the resonator being particularly useful for microwave application.

According to the present invention there is provided a dielectric ceramic material with a composition of Formula (1)

$$x\,CaTiO_3+(1-x)Sm_zRe_{(1-z)}AlO_3 \qquad (1)$$

wherein $0.5 \leq x \leq 0.9$
$0.3 \leq z \leq 0.995$

Re may be selected from a group consisting of La, Pr, Dy, Gd, Y, Er, Ho and mixtures thereof.

Materials in accordance with this invention find application in microwave base station filters (single and multimode). Preferred materials may be prepared which allow changes to relative permittivity $\in_r$ and TCf values while retaining Q values >10,000 at 2 GHz suitable for their intended applications. Materials of this invention may yield superior dielectric loss characteristics in comparison to prior art compositions. They are also relatively economical to manufacture.

Preferred materials in accordance with this invention possess high relative permittivity $\in_r$ values in comparison to known materials with equivalent Q values. Particularly preferred materials have $\in_r$ of 40-50, Q>10000 at 2 GHz (Qf>20000 GHz) and TCf between −20 to +20 $MK^{-1}$ Materials in accordance with this invention possess further advantages in relation to materials disclosed in the prior art, for example U.S. Pat. No. 5,356,844, because the ceramics of this invention have an improved microwave quality factor at ambient and higher operating temperatures.

Preferred materials consist essentially of a composition of Formula 2

$$x\,CaTi_{1.03}O_3+(1-x)Sm_{0.95}Y_{0.05}AlO_3 \qquad (2)$$

wherein $0.65 \leq x \leq 0.72$

Further preferred materials consist essentially of a composition of Formula 3

$$x\,CaTi_{1.03}O_3+(1-x)Sm_{0.8}Y_{0.2}AlO_3 \qquad (3)$$

wherein $0.65 \leq x \leq 0.72$

In further preferred materials, Re consists essentially of a composition of two or more elements selected from the group consisting of: La, Nd, Pr, Dy, Gd, Y, Er and Ho.

A dopant selected from $CeO_2$, $Fe_2O_3$, $MnO_2$, $Nb_2O_5$, $Ta_2O_5$, $Ga_2O_3$ and mixtures thereof. The dopant may be present in an amount of about 20 to about 5000 ppm, more preferably about 20 to about 1000 ppm.

$CeO_2$ where present may be added as a dopant in the range about 50 ppm to about 2.0 wt %.

The Ca, Al, Ti or Re site occupancies may all be varied by +/−10%.

The electrical properties for these ceramics can be summarised as follows:

$\in_r$ 40-50

Q (2 GHz)>10000

TCf(variable through composition) −10 to +10 $MK^{-1}$

Compositions of the present invention may be manufactured by mixing the appropriate oxides, carbonates or oxalates or mixtures thereof in the above mentioned proportions, pulverising the mixture using a wet or dry method, calcining the mixture at a temperature of 1100° C. to 1400° C. for 1 to 16 hours, shaping the calcined mixture into an optional form and sintering the shaped body at a temperature of 1400° C. to 1700° C.

Percentages and other amounts referred to in this specification are by weight unless indicated otherwise. Percentages and other proportions are selected from the ranges specified to total 100%.

The invention is further described by means of example but not in any limitative sense;

EXPERIMENTAL PROCEDURE

All initial starting powders were of purity >99%. The raw materials were weighed in the appropriate quantities to form the compositions required. Deionised water or propan-2-ol was added to the weighed batches which were subsequently ball milled with magnesia stabilised zirconia milling media for 16 hours. Alternatively, the materials were attrition milled for 2 hours with zirconia media. Subsequently, the raw material batches were dried at 80° C. and sieved through a 250 μm nylon mesh. The dried powder was calcined at temperatures in the interval 1150° C. to 1350° C. for 2 to 16 hours. The as-calcined powders were re-milled with 2 wt % PEG binder (MW 10000) for 8 hours, dried and sieved. Standard test samples of 9.2 g weight were uniaxially pressed in a 20 mm hardened stainless steel die using a pressure of ~150 MPa. Sintering of the pellets was performed between 1350 and 1600° C. for 1 to 48 hours under either an air or oxygen atmosphere. All samples were of density >95% theoretical density using the Archimedes water immersion technique.

The electrical properties were tested on the sintered components. Microwave dielectric properties were measured in reflection using the TE01δ mode in a cubic silver plated cavity. TCf measurements were made in the interval +80° C. to −20° C. with the values of 60, 20 and −10° C. being used to calculate TCf. $\in_r$ measurements were made using the parallel plate transmission technique of Hakki and Coleman.

EXAMPLE 1

Molar Ratios Required for Useful TCf Materials

Data for mixtures of $CaTiO_3$ (CT) and $Sm_{0.95}Y_{0.05}AlO_3$ (SYA) plus 0.2 wt % $CeO_2$ as excess, aiming for a TCf between +6 and −3 $MK^-$ were as shown in Table 1:

TABLE 1

| Material | Density/g cm⁻³ | f/GHz | $\in_r$ | Q | Qf/GHz | TCf/MK⁻¹ |
|---|---|---|---|---|---|---|
| 0.69 CT-0.31 SA | 4.84 | 2.72 | 44.5 | 16000 | 43500 | 2.3 |
| 0.7 CT-0.3 SYA | 4.80 | 2.68 | 45.2 | 15700 | 42000 | 6.4 |
| 0.69 CT-0.31 SYA | 4.82 | 2.71 | 44.1 | 15700 | 42500 | 1.7 |
| 0.68 CT-0.32 SYA | 4.86 | 2.75 | 43.1 | 15800 | 43200 | −3.1 |

SA denotes $SmAlO_3$.

Data for mixtures of $CaTiO_3$ (CT) and $Sm_{0.95}Pr_{0.05}AlO_3$ (SPA) plus 0.2 wt % $CeO_2$ as excess, aiming for a TCf between +6 and −3 $MK^{-1}$ were as shown in Table 2:

TABLE 2

| Material | Density/g cm$^{-3}$ | f/GHz | $\epsilon_r$ | Q | Qf/GHz | TCf/MK$^{-1}$ |
|---|---|---|---|---|---|---|
| 0.7 CT-0.3 SPA | 4.80 | 2.71 | 44.6 | 15600 | 41600 | 7.1 |
| 0.69 CT-0.31 SPA | 4.83 | 2.67 | 44.4 | 15600 | 42300 | 2.3 |
| 0.68 CT-0.32 SPA | 4.87 | 2.71 | 44.4 | 15800 | 43200 | −2.6 |

Data for mixtures of $CaTiO_3$ (CT) and $Sm_{0.95}Dy_{0.05}AlO_3$ (SDA) plus 0.2 wt % $CeO_2$ as excess, aiming for a TCf between +6 and −3 $MK^{-1}$ were as shown in Table 3:

TABLE 3

| Material | Density/g cm$^{-3}$ | f/GHz | $\epsilon_r$ | Q | Qf/GHz | TCf/MK$^{-1}$ |
|---|---|---|---|---|---|---|
| 0.7 CT-0.3 SDA | 4.82 | 2.68 | 45.2 | 15400 | 41100 | 7.1 |
| 0.69 CT-0.31 SDA | 4.85 | 2.71 | 44.3 | 15400 | 41600 | 2.2 |
| 0.68 CT-0.32 SDA | 4.88 | 2.74 | 43.2 | 15500 | 42300 | −2.3 |

Data for mixtures of $CaTiO_3$ (CT) and $Sm_{0.95}Gd_{0.05}AlO_3$ (SGA) plus 0.2 wt % $CeO_2$ as excess, aiming for a TCf between +6 and −3 $MK^{-1}$ were as shown in Table 4:

TABLE 4

| Material | Density/g cm$^{-3}$ | f/GHz | $\epsilon_r$ | Q | Qf/GHz | TCf/MK$^{-1}$ |
|---|---|---|---|---|---|---|
| 0.7 CT-0.3 SGA | 4.82 | 2.67 | 45.3 | 12500 | 33400 | 6.3 |
| 0.69 CT-0.31 SGA | 4.85 | 2.71 | 44.2 | 12500 | 33700 | 1.6 |
| 0.68 CT-0.32 SGA | 4.88 | 2.74 | 43.2 | 12500 | 34100 | −3.1 |

The influence of the rare earth ion upon properties was summarised as shown in Table 5. Composition: $0.69\,CaTiO_3 + 0.31\,Sm_{0.95}Re_{0.05}AlO_3$ with 0.2 wt % excess $CeO_2$

TABLE 5

| Re | Density/g cm$^{-3}$ | f/GHz | $\epsilon_r$ | Q | Qf/GHz | TCf/MK$^{-1}$ |
|---|---|---|---|---|---|---|
| $La_2O_3$ | 4.82 | 2.71 | 44.7 | 15900 | 42900 | 2.7 |
| $Y_2O_3$ | 4.82 | 2.71 | 44.1 | 15700 | 42500 | 1.7 |
| $Pr_6O_{11}$ | 4.83 | 2.67 | 45.5 | 15600 | 42300 | 2.3 |
| $Dy_2O_3$ | 4.85 | 2.71 | 44.3 | 15400 | 41600 | 2.2 |
| $Gd_2O_3$ | 4.85 | 2.71 | 44.2 | 12500 | 33700 | 1.6 |

EXAMPLE 2

Influence of Rare Earth Ion Concentration Upon Dielectric Properties

The following data was generated for the composition:

$$0.69\,CaTiO_{3} + 0.31\,Sm_zRe_{(1-z)}AlO_3$$

Results using $Y_2O_3$ as a substituent for $Sm_2O_3$ are as shown in Table 6.

TABLE 6

| z | Density/g cm$^{-3}$ | f/GHz | $\epsilon_r$ | Q | Qf/GHz | TCf/MK$^{-1}$ |
|---|---|---|---|---|---|---|
| 1 | 4.84 | 2.72 | 44.5 | 16000 | 43500 | 2.3 |
| 0.99 | 4.83 | 2.72 | 44.5 | 16000 | 43400 | 2.4 |
| 0.975 | 4.82 | 2.72 | 44.4 | 16000 | 43500 | 2.3 |
| 0.95 | 4.80 | 2.72 | 44.3 | 16100 | 43700 | 2.2 |
| 0.9 | 4.77 | 2.72 | 44.2 | 16300 | 44400 | 1.7 |
| 0.8 | 4.72 | 2.72 | 43.8 | 16800 | 45600 | 1.1 |
| 0.6 | 4.62 | 2.73 | 43.0 | 17100 | 46600 | −0.4 |
| 0.4 | 4.52 | 2.73 | 42.5 | 16800 | 45800 | −1.4 |
| 0.2 | 4.40 | 2.75 | 39.1 | 7600 | 20800 | −49.0 |
| 0 | 4.27 | 2.79 | 37.7 | 1200 | 3400 | |

Results using $Pr_6O_{11}$ as a substituent for $Sm_2O_3$, with 0.2 wt % $CeO_2$ as excess are shown in Table 7.

TABLE 7

| z | Density/g cm$^{-3}$ | f/GHz | $\epsilon_r$ | Q | Qf/GHz | TCf/MK$^{-1}$ |
|---|---|---|---|---|---|---|
| 1 | 4.84 | 2.72 | 44.5 | 16000 | 43500 | 2.3 |
| 0.95 | 4.83 | 2.71 | 44.4 | 15600 | 42300 | 2.3 |
| 0.9 | 4.83 | 2.70 | 41.6 | 15600 | 42000 | 2.7 |
| 0.85 | 4.83 | 2.69 | 41.6 | 15400 | 41500 | 3.2 |

Results using $La_2O_3$ as a substituent for $Sm_2O_3$ are shown in Table 8.

TABLE 8

| z | Density/ g cm$^{-3}$ | f/GHz | $\epsilon_r$ | Q | Qf/GHz | TCf/MK$^{-1}$ |
|---|---|---|---|---|---|---|
| 1 | 4.84 | 2.72 | 44.5 | 16000 | 43500 | 2.3 |
| 0.99 | 4.82 | 2.72 | 44.5 | 16000 | 43500 | 2.4 |
| 0.975 | 4.82 | 2.71 | 44.5 | 16000 | 43200 | 2.4 |
| 0.95 | 4.82 | 2.71 | 44.7 | 15900 | 42900 | 2.7 |
| 0.9 | 4.81 | 2.70 | 44.9 | 15700 | 42300 | 3.1 |
| 0.8 | 4.81 | 2.69 | 45.4 | 15100 | 40600 | 4.3 |

EXAMPLE 3

Influence of Dopants Upon the Dielectric Properties

The following data was generated for the composition 0.69 $CaTiO_3$+0.31 $ReAlO_3$ as shown in Table 9.

TABLE 9

| Re | Dopant | Density/ g cm$^{-3}$ | f/GHz | $\epsilon_r$ | Q | Qf/ GHz | TCf/ MK$^{-1}$ |
|---|---|---|---|---|---|---|---|
| $Sm_{0.8}Y_{0.2}$ | Nil | 4.72 | 2.72 | 43.8 | 16800 | 45600 | 1.1 |
| $Sm_{0.8}Y_{0.2}$ | 0.2 wt % $CeO_2$ as excess | 4.73 | 2.72 | 43.6 | 16500 | 44900 | 0.3 |
| $Sm_{0.95}Y_{0.05}$ | Nil | 4.80 | 2.72 | 44.3 | 16100 | 43700 | 2.2 |
| $Sm_{0.95}Y_{0.05}$ | 0.01 mol $Ga_2O_3$ on Ti site | 4.82 | 2.74 | 43.6 | 15600 | 42700 | 0.4 |
| $Sm_{0.95}Y_{0.05}$ | 0.2 wt % $Ga_2O_3$ as excess | 4.83 | 2.72 | 44.4 | 15600 | 42400 | 2.4 |
| $Sm_{0.95}Y_{0.05}$ | 0.2 wt % $Fe_2O_3$ as excess | 4.83 | 2.71 | 44.5 | 15000 | 40800 | 2.6 |
| $Sm_{0.95}Y_{0.05}$ | 0.2 wt % $MnO_2$ as excess | 4.83 | 2.71 | 44.3 | 14700 | 39900 | 2.0 |
| $Sm_{0.95}Y_{0.05}$ | 0.2 wt % $Ta_2O_5$ as excess | 4.84 | 2.72 | 44.4 | 15600 | 42500 | 2.1 |
| $Sm_{0.95}Y_{0.05}$ | 0.2 wt % $Nb_2O_5$ as excess | 4.83 | 2.71 | 44.6 | 15600 | 42300 | 2.2 |

All data is provisional and based upon non optimised dopant concentrations and firing conditions.

EXAMPLE 4

Sintering Time and Temperature Reduction

The following data was generated for the composition 0.69 $CaTiO_3$+0.31 $Sm_{0.8}Y_{0.2}AlO_3$ as shown in Table 10.

TABLE 10

| Sinter T/t | Density/ g cm$^{-3}$ | f/GHz | $\epsilon_r$ | Q | Qf/GHz | TCf/MK$^{-1}$ |
|---|---|---|---|---|---|---|
| 1425/8 | 4.66 | 2.74 | 42.6 | 15800 | 43300 | 1.8 |
| 1450/8 | 4.73 | 2.72 | 43.9 | 16600 | 45100 | 1.4 |
| 1475/8 | 4.72 | 2.72 | 43.8 | 17000 | 46300 | 1.2 |
| 1500/8 | 4.72 | 2.72 | 43.8 | 16800 | 45600 | 1.1 |
| 1525/8 | 4.76 | 2.72 | 43.8 | 16400 | 44700 | 1.0 |
| 1450/24 | 4.75 | 2.72 | 44.0 | 16800 | 45600 | 1.2 |
| 1500/2 | 4.70 | 2.72 | 43.4 | 16300 | 44500 | 1.3 | where T denotes temperature in ° C. and t denotes time in hours

The following data was generated for the composition 0.69 $CaTiO_3$+0.31 $Nd_{0.95}Sm_{0.95}AlO_3$+0.2 wt % $CeO_2$ as a comparison to the above as shown in Table 11.

TABLE 11

| Sinter T/t | Density/ g cm$^{-3}$ | f/GHz | $\epsilon_r$ | Q | Qf/GHz | TCf/MK$^{-1}$ |
|---|---|---|---|---|---|---|
| 1425/8 | 4.78 | 2.68 | 45.5 | 15100 | 40400 | 1.8 |
| 1450/8 | 4.81 | 2.69 | 45.5 | 15500 | 41800 | 1.0 |
| 1475/8 | 4.81 | 2.69 | 45.5 | 15800 | 42400 | 0.9 |
| 1530/8 | 4.78 | 2.69 | 45.3 | 15700 | 42400 | 0.8 | where T denotes temperature in ° C. and t denotes time in hours

The invention claimed is:

1. A dielectric ceramic material with a composition of Formula (1)

$$x\,CaTiO_3+(1-x)Sm_zRe_{(1-z)}AlO_3 \qquad (1)$$

wherein $0.65 \leq x \leq 0.72$
$0.8 \leq z \leq 0.995$
Re is selected from the group consisting of La and Y and mixtures thereof.

2. A dielectric ceramic material as claimed in claim 1 with a composition of Formula (2)

$$x\,CaTi_{1.03}O_3+(1-x)Sm_{0.95}Y_{0.05}AlO_3 \qquad (2)$$

wherein $0.65 \leq x \leq 0.72$.

3. A dielectric ceramic material as claimed in claim 1 with a composition of formula (3)

$$x\,CaTi_{1.03}O_3+(1-x)\,Sm_{0.8}Y_{0.2}AlO_3 \qquad (3)$$

wherein $0.65 \leq x \leq 0.72$.

4. A dielectric ceramic material as claimed in claim 1, wherein Sr, Mg or a mixture thereof are substituted for Ca in an amount of 0 to 20 mol %.

5. A dielectric ceramic material as claimed in claim 1, including a dopant, wherein the dopant is selected from the group consisting of: $CeO_2$, $Nb_2O_5$, $Ga_2O_3$, and mixtures thereof, wherein the total amount of dopant is from about 20 ppm to 2 wt %.

6. A dielectric ceramic material as claimed in claim 5, wherein $CeO_2$ is added as a dopant in the range about 50 ppm to about 2.0 wt %.

7. A dielectic ceramic material as claimed in claim 1, wherein the cation site occupancy of Ca, Ti, Re and Al is varied by ±10%.

8. A dielectric resonator comprising a dielectric ceramic material as claimed in claim 1.

* * * * *